United States Patent [19]
Saito

[11] Patent Number: 5,096,690
[45] Date of Patent: Mar. 17, 1992

[54] METHOD AND APPARATUS FOR MANUFACTURING SILVER HALIDE GRAINS

[75] Inventor: Hirokazu Saito, Kanagawa, Japan
[73] Assignee: Fuji Photo Film Co., Ltd., Kanagawa, Japan
[21] Appl. No.: 52,939
[22] Filed: May 22, 1987
[30] Foreign Application Priority Data
  May 22, 1986 [JP] Japan ................. 61-116046
[51] Int. Cl.$^5$ ................................. C01B 9/00
[52] U.S. Cl. ...................... 423/491; 423/42; 423/46; 423/225; 423/227; 423/230; 423/231; 422/209
[58] Field of Search .......... 423/491, 46, 42; 422/209, 225, 227, 230, 231

[56] References Cited
U.S. PATENT DOCUMENTS

| | | | |
|---|---|---|---|
| 1,720,196 | 7/1929 | Bailey et al. | 422/209 |
| 2,208,637 | 7/1940 | Jones et al. | 422/209 |
| 4,289,733 | 9/1981 | Saito et al. | 422/227 |

FOREIGN PATENT DOCUMENTS

| | | | |
|---|---|---|---|
| 0137398 | 4/1985 | European Pat. Off. | 423/491 |
| 2555364 | 6/1976 | Fed. Rep. of Germany | 423/491 |
| 10544 | 3/1980 | Japan . | |
| 10545 | 3/1980 | Japan . | |
| 92523 | 6/1982 | Japan . | |
| 92524 | 6/1982 | Japan . | |
| 177834 | 8/1985 | Japan . | |
| 1515139 | 6/1978 | United Kingdom | 423/491 |

OTHER PUBLICATIONS

Perry et al., "Chemical Engineer's Handbook", Fifth Ed., 21-6 to 21-8 (McGraw-Hill Book Company).

Primary Examiner—Robert Kunemund
Attorney, Agent, or Firm—Sughrue, Mion, Zinn, Macpeak & Seas

[57] ABSTRACT

A method and apparatus for manufacturing silver halide grains wherein a water-soluble silver salt solution and a water-soluble halide solution are separately introduced within a hollow cylindrical structure open at each end which is rotatable mounted about its longitudinal axis within a reaction vessel containing a colloidal aqueous solution. The colloidal aqueous solution within the cylindrical structure is stirred and mixed during the addition of the silver salt solution and halide solution and the silver halide grains which form within the cylindrical structure are immediately discharged into the colloidal aqueous solution between the outer circumference of the cylindrical structure and the reaction vessel through slits in the circumference of the cylindrical structure. The silver halide grains are uniformly produced and grown without crystallite within a narrow size distribution range and the process may be scaled up from experimental to commercial scale without loss of desired characteristics and with high produced reproducibility.

3 Claims, 3 Drawing Sheets

METHOD AND APPARATUS FOR MANUFACTURING SILVER HALIDE GRAINS

FIELD OF THE INVENTION

The present invention relates to a method and an apparatus for manufacturing silver halide grains, and particularly relates to a method and an apparatus in which a photographic silver halide emulsion whose properties are the same as those of a photographic silver halide emulsion manufactured through the use of the small-capacity reaction vessel of a stirring mixer for producing silver halide grains can be manufactured even if the capacity of a reaction vessel in the method and the apparatus is increased.

BACKGROUND OF THE INVENTION

In a conventional method and a conventional apparatus such as those disclosed in the Japanese Patent Publication No. 10544/80, the Japanese Patent Publication No. 10545/80, the Japanese Patent Application (OPI) No. 92524/82 (the term "OPI" as used herein means an "unexamined published application") and the Japanese Utility Model Application (OPI) No. 117834/85 for manufacturing silver halide grains, a water-soluble silver salt solution and a water-soluble halide solution are put into a mixing chamber in a reaction vessel and quickly stirred and mixed together to react with each other to produce the silver halide grains and disperse crystallates to age the grains.

However, the larger the capacity of the reaction vessel is, the more difficult it is to mix the solutions uniformly in the reaction vessel. For that reason, the silver halide grains can have a different crystal appearance, grain distribution or the like from those desired.

DESCRIPTION OF THE PRESENT INVENTION

The present invention was made in order to solve the above-mentioned problem.

Accordingly, it is an object of the present invention to provide a method and a apparatus for manufacturing silver halide grains in which properties such as the grain diameter, mean grain size, crystal appearance and sensitivity of silver halide grains manufactured on a small experimental scale can be easily reproduced by large scale manufacturing equipment and tabular silver halide grains with less formation of small crystallites can be manufactured within a narrow range of size distribution.

In the method of the invention, a water-soluble silver salt solution and a water-soluble halide solution are added to a colloidal aqueous solution in a mixing chamber inside a reaction vessel filled with the colloidal aqueous solution so as to react with each other to produce the silver halide grains. The method is characterized in that the water-soluble silver salt solution and the water-soluble halide solution are separately supplied into the mixing chamber so that the solutions are diluted with the colloidal aqueous solution in the mixing chamber. Both of the supplied solutions are quickly stirred and mixed together by rapidly-rotating blades in the mixing chamber so that they can react with each other to produce the silver halide grains and the grains are immediately discharged into the colloidal aqueous solution in the reaction vessel through slits in a rotating cylinder which confines the mixing chamber so that the grains are aged.

The apparatus of the invention contains means for separately supplying a water-soluble silver salt solution and a water-soluble halide solution into a colloidal aqueous solution in a mixing chamber. The mixing chamber is a hollow cylindrical body within a reaction vessel filled with the colloidal aqueous solution. The apparatus is characterized in that (1) the top and bottom of the mixing chamber are open and rapidly-rotating blades are provided in the central portion of the mixing chamber, (2) the cylinder which confines the mixing chamber has such a construction that enable the cylinder to be freely rotated about an axis which is central to all parts of the cylinder by the flowing collision of the rapidly-rotating blades acting as a stirring means inside the cylinder, (3) a several number of impellers are provided outside the cylinder, and (4) numerous slits are provided in the wall of the outer cylinder.

DESCRIPTION OF THE DRAWINGS

An embodiment of the present invention is hereafter described with reference to the drawings.

DETAILED DESCRIPTION OF THE INVENTION

Figure 1:
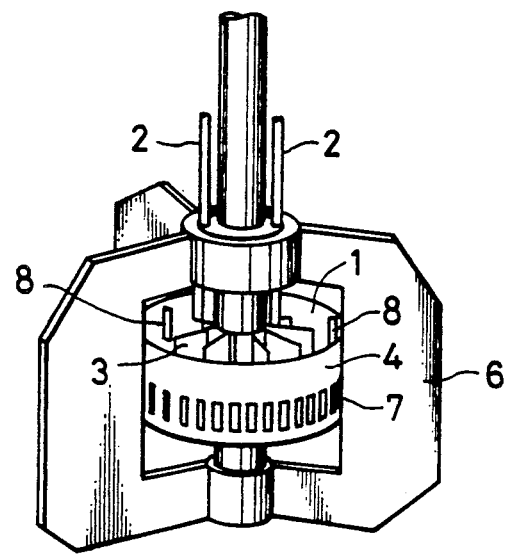
FIG. 1 shows a perspective view of a mixing chamber 1 for producing silver halide grains in accordance with the present invention.
Figure 3:
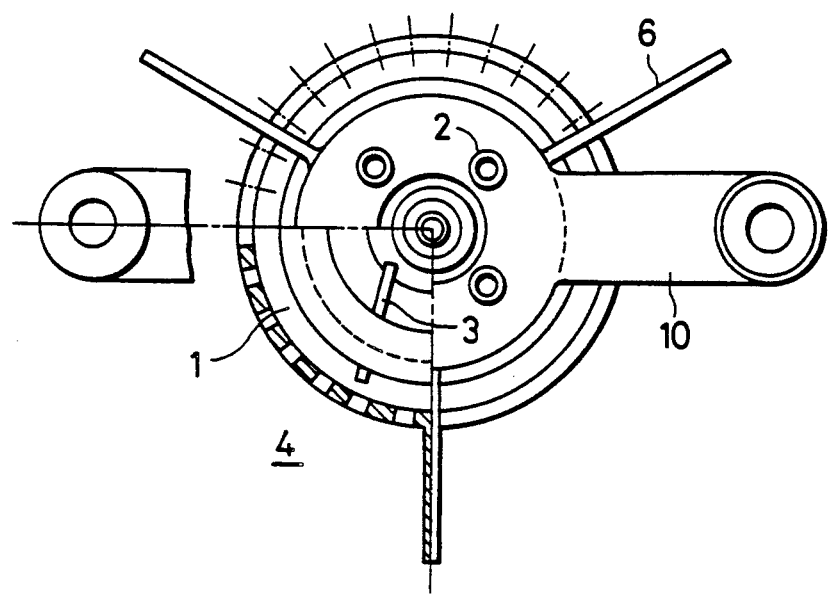
FIG. 3 shows a downward view of the mixing chamber 1.
Figure 4:
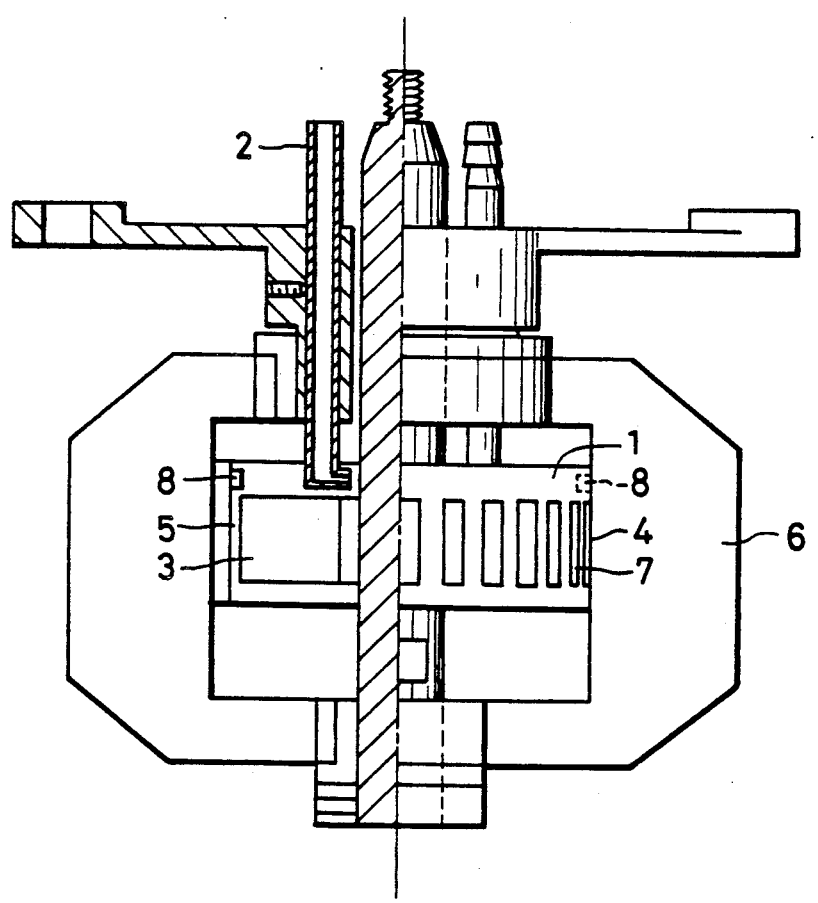
FIG. 4 shows a side view of the mixing chamber 1.

As shown in FIGS. 1, 3 and 4, a several number of nozzles 2 for adding a water-soluble silver salt solution and water-soluble halide solution are provided and are directed downward. Rapidly-rotating blades 3 are provided in the central portion of the mixing chamber 1 so that a clearance 5 is kept between an outer cylinder 4 around the mixing chamber and the rapidly-rotating blades. Four baffle plates 8 are provided on the inside surface of the wall of the outer cylinder 4. Three impellers 6 are provided outside the wall of the outer cylinder 4. Numerous slits 7 are provided in the wall of the outer cylinder 4. A support 10 may be provided to a device according to this invention as shown in FIG. 3.

Appropriate shapes for mixing chamber 1 are, for example, a straight or bulged (i.e., convex) cylinder whose top and bottom are open.

The rapidly-rotating blades 3 provided in the central portion of the mixing chamber 1 are of the radial flow type like a turbine, a fan turbine and a curved-blade turbine and not of the axial flow type like a twisted fan turbine and a propeller. An appropriate rotational frequency of the rapidly-rotating blades 3 is in the range from 500 to 5,000 rpm.

The rapidly-rotating blades 3 function to cause the water-soluble silver salt solution and the water-soluble halide solution to react quickly with each other in the mixing chamber 1 to produce the silver halide grains, and also functions to cause a flowing impact to rotate the freely-rotatable outer cylinder 4 around the mixing chamber to discharge the silver halide grains into a colloidal aqueous solution in the reaction vessel 9 through the slits 7 of the wall of the outer cylinder.

The clearance between the outer cylinder 4 and the rapidly-rotating blades 3 is 5 mm or less, preferably 1 to 2 mm.

The outer cylinder 4 around the mixing chamber 1 is supported by a bearing so that the outer cylinder is freely rotatable. The baffle plates 8 are provided on the inside surface of the wall of the outer cylinder 4, if necessary, to promote the rotation of the cylinder.

The impellers 6 are attached to the outside surface of the wall of the outer cylinder 4. The appropriate number of the impellers 6 is 2 to 8.

The width of each of the numerous slits 7 provided in the wall of the outer cylinder 4 is 10 mm or less, preferably 2 to 5 mm. The ratio of the area of the slit openings to the surface area of the outer surface of the outer cylinder 4 is 30 to 60%.

An appropriate rotational frequency of the outer cylinder 4 is in the range from 1/10 to ½ of that of the rapidly-rotating blades 3.

The appropriate number of the nozzles 2 for adding the solutions to react with each other is 2 to 8. The diameter of each of the nozzles 2 and the number of them are designed so that the flow velocity of each of the solutions added through the nozzles is not higher than the circumferential velocity of the rapidly-rotating blades 3.

According to the present invention, the dimensions of large-scale manufacturing equipment for producing silver halide grains are determined in proportion to the cubic root of the capacity of the reaction vessel 9 when results achieved on a small experimental scale are to be achieved by large-scale manufacturing equipment.

The operation of the embodiment is described in detail hereinafter. The water-soluble silver salt solution and the water-soluble halide solution which are added into the mixing chamber 1 through the nozzles 2 are diluted with the colloidal aqueous solution filled in the mixing chamber. The added solutions are then quickly stirred and mixed together by the rapidly-rotating blades 3 so as to react with each other to produce the silver halide grains.

The silver halide grains are uniformly dispersed to the central portion of the reaction vessel 9 through the slits 7 of the outer cylinder 4 freely rotatable by the flowing impact of the rapidly-rotating blades 3. At that time, the silver halide grains collide against the wall of the reaction vessel 9 so that upper and lower liquid flows are caused.

The upper and lower liquid flows are sucked in through the open top and bottom of the mixing chamber 1 by the rapidly-rotating blades 3 so that the silver halide grains are grown by the added silver salt solution and the added halide solution. The impellers 6 attached to the outside surface of the outer cylinder 4 around the mixing chamber 1 act to accelerate the liquid flows in the reaction vessel 9.

The present invention is characterized in that the silver halide grains are uniformly produced and grown by the rapidly-rotating blades and the silver halide grains dispersed out of the rotary mixing chamber flow actively and regularly in the reaction vessel so that flat silver halide grains without crystallites are grown within a narrow range of size distribution.

The present invention is also characterized in that flat silver halide grains whose properties are the same as those of flat silver halide grains manufactured on a small experimental scale can be manufactured on a large scale with a high reproducibility.

EXAMPLE

Figure 2:
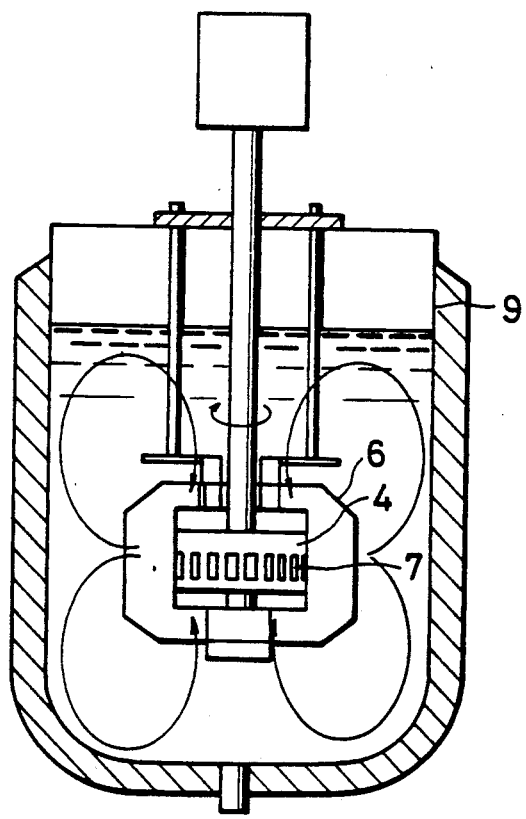
FIG. 2 shows a sectional view of the reaction vessel of a silver halide grain manufacturing apparatus provided in accordance with the present invention.

The manufacturing apparatus provided in accordance with the present invention and shown in FIG. 2 and a conventional manufacturing apparatus disclosed in the Japanese Patent Publication No. 10545/80 were used to manufacture flat silver halide grains at a mean size of 1.1 $\mu$m on a small experimental scale and a large practical scale. The ratio of fine grains of 0.2 $\mu$m or less in size to all the flat silver halide grains manufactured by using the device provided in accordance with the present invention was compared with that of fine grains of 0.2 $\mu$m or less in size to all the flat silver halide grains manufactured by using the conventional apparatus.

Figure 5:
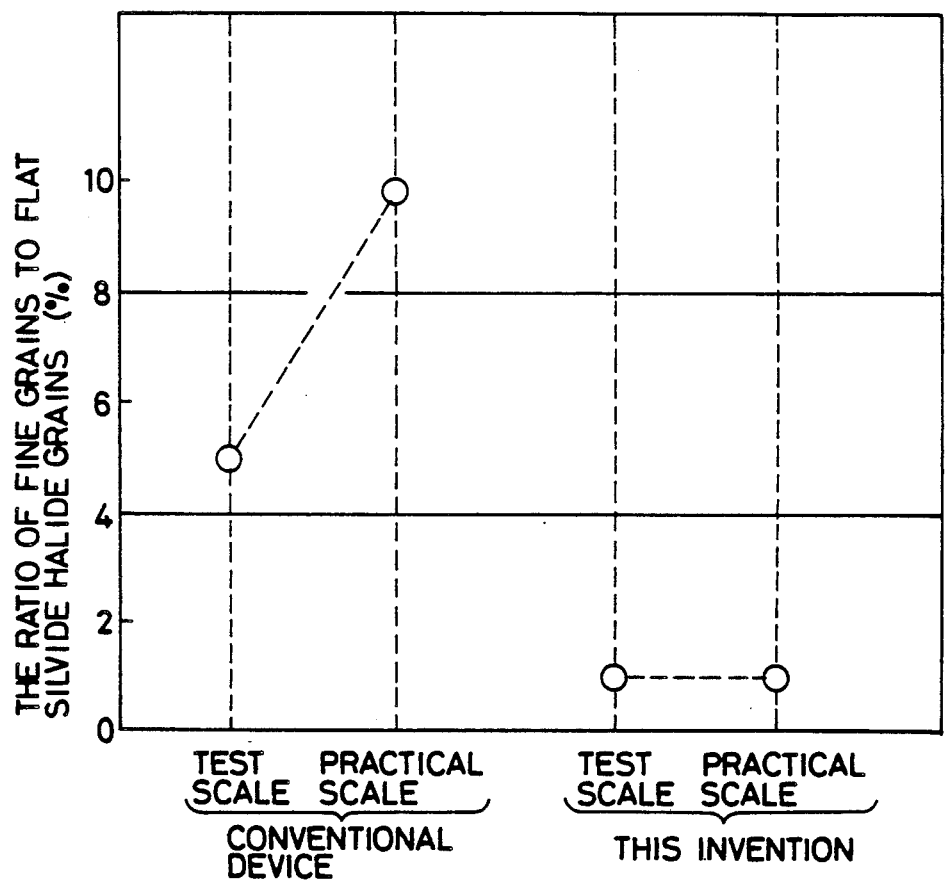

As shown in FIG. 5, the ratio through the use of the conventional apparatus was about 5% on the small experimental scale and about 10% on the large practical scale, while that through the use of the device provided in accordance with the present invention was about 1% both on the small experimental scale and on the large practical scale. Therefore, it is understood that the reproducibility of the ratio with regard to the scale of the manufacturing of the flat silver halide grains through the use of the apparatus provided in accordance with the present invention is high.

According to the present invention, a method and a device in which silver halide grains are produced by rapid rotary stirring in a mixing chamber and discharged into a colloidal aqueous solution in a reaction vessel through the slits of a rotating outer cylinder around the mixing chamber so as to be aged are provided so that the properties of the silver halide grains manufactured on a small experimental scale can be easily reproduced in large manufacturing equipment. In addition, flat silver halide grains without crystallites can be manufactured within a narrow size distribution range.

What is claimed is:

1. A method of manufacturing silver halide grains, comprising the steps of:

separately and simultaneously adding a water-soluble silver salt solution and a water-soluble halide solution into a hollow cylindrical structure open at each end which is freely rotatably mounted about its longitudinal axis within a reaction vessel containing a colloidal aqueous solution in such a manner as to permit the flow of the colloidal aqueous solution about the sides of the cylindrical structure;

stirring and mixing together the silver salt solution and the halide solution in the colloidal aqueous solution by a stirring means within the cylindrical structure;

discharging the silver halide grains which form as the result of the stirring and mixing of the colloidal aqueous solution containing silver salt ions and halide ions into the colloidal aqueous solution between the outer circumference of the cylindrical structure and the reaction vessel through a plurality of longitudinally elongated openings along the circumference of the cylindrical structure, thus causing a flow of colloidal aqueous solution;

freely rotating the cylindrical structure about its longitudinal axis by the flowing impact of the flow of colloidal aqueous solution being stirred by the stirring means, forming two liquid flows of colloidal aqueous solution, an upper flow and a lower flow, wherein the upper flow gushes upwardly in the reaction vessel and then enters the cylindrical structure from the top side of the cylindrical structure, and the lower flow gushes downwardly in the reaction vessel and then enters the cylindrical structure from the bottom side of the cylindrical structure; and accelerating the upper and lower flows of the colloidal aqueous solution in the reaction vessel by providing a plurality of flat, blade-like structures attached to the outer wall of the cylindrical structure, the blade-like structures protruding from the wall of the cylindrical structure outward into the surrounding colloidal aqueous solution within the reaction vessel.

2. The method of claim 1, further comprising the step of:

rotating the stirring means at a rotational frequency of from 500 to 5,000 rpm, the stirring means being provided in the central portion of the cylindrical structure.

3. A method of manufacturing silver halide grains, comprising the steps of:

separately and simultaneously adding a water-soluble silver salt solution and a water-soluble halide solution into a vertically oriented hollow cylindrical structure open at each end which is rotatably mounted about its longitudinal axis within a reaction vessel containing a colloidal aqueous solution in such a manner as to permit the flow of the colloidal aqueous solution about both the inner and outer sides of the cylindrical structure;

stirring and mixing together the silver salt solution and the halide solution in the colloidal aqueous solution by a stirring means in the form of rapidly rotating blades within the cylindrical structure;

discharging the silver halide grains which form as the result of the stirring and mixing of the colloidal aqueous solution containing silver salt ions and halide ions into the colloidal aqueous solution between the outer circumference of the cylindrical structure and the reaction vessel through a plurality of longitudinally elongated openings along the circumference of the cylindrical structure, thus causing a flow of colloidal aqueous solution;

freely rotating the cylindrical structure about its longitudinal axis by the flowing impact of the flow of colloidal aqueous solution being stirred by the stirring means, forming two liquid flows of colloidal aqueous solution, an upper flow and a lower flow, wherein the upper flow gushes upwardly in the reaction vessel and then enters the cylindrical structure from the top side of the cylindrical structure, and the lower flow gushes downwardly in the reaction vessel and then enters the cylindrical structure form bottom side of the cylindrical structure;

rotating the cylindrical structure at a rotational frequency of from 1/10 to $\frac{1}{3}$ of the rotational frequency of the rapidly-rotating blades;

promoting the rotation of the cylindrical structure by the driving force of the flowing solution being received by baffle plates, which are provided on the inside surface of the wall of the cylindrical structure; and accelerating the upper and lower flows of the colloidal aqueous solution in the reaction vessel by providing a plurality of flat, blade-like structures attached to the outer wall of the cylindrical structure, the blade-like structures protruding from the wall of the cylindrical structure outward into the surrounding colloidal aqueous solution within the reaction vessel.

* * * * *